United States Patent

Markham et al.

[11] Patent Number: 5,865,947
[45] Date of Patent: *Feb. 2, 1999

[54] METHOD FOR RECYCLING MIXED WASTEPAPER INCLUDING PLASTIC-CONTAINING PAPER AND INK PRINTED PAPER

[75] Inventors: Larry D. Markham, Mobile, Ala.; Narendra R. Srivatsa, Ramsey, N.J.

[73] Assignee: International Paper Company, Purchase, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 444,176

[22] Filed: May 18, 1995

[51] Int. Cl.[6] ................................................. D21C 5/02
[52] U.S. Cl. ..................................... 162/5; 162/4
[58] Field of Search ................... 162/4, 5, 8, 55

[56] References Cited

U.S. PATENT DOCUMENTS

| | | |
|---|---|---|
| 1,628,931 | 5/1927 | Todd . |
| 2,776,209 | 1/1957 | O'Flynn ........................ 92/1.5 |
| 2,968,576 | 1/1961 | Keller et al. .................. 117/47 |
| 3,764,460 | 10/1973 | Miyamoto et al. ............ 162/5 |
| 3,933,577 | 1/1976 | Penque ........................... 162/4 |
| 3,963,560 | 6/1976 | Mestetsky et al. ............. 162/5 |
| 4,076,578 | 2/1978 | Puddington et al. ........... 162/5 |
| 4,332,638 | 6/1982 | Mauer et al. ................... 162/4 |
| 5,234,543 | 8/1993 | Markham et al. .............. 162/5 |
| 5,340,439 | 8/1994 | Markham et al. .............. 162/5 |
| 5,453,159 | 9/1995 | Markham ....................... 162/5 |
| 5,466,333 | 11/1995 | Guttag ............................ 162/6 |

FOREIGN PATENT DOCUMENTS 6 220784  8/1994  Japan .................... D21C 5/02

OTHER PUBLICATIONS

Sansink PX–101; Data Sheet, PPG Industries, Inc., Pittsburg, PA.
Sansink PM–201; Data Sheet, PPG Industries, Inc. Pittsburg, PA.

Primary Examiner—Peter Chin
Assistant Examiner—Dean T. Nguyen
Attorney, Agent, or Firm—Ostrager Chong Flaherty & Onofrio

[57] ABSTRACT

Recycling of mixed wastepaper, including plastic coated paper and printed paper, is accomplished by repulping the wastepaper mixture to disperse paper fibers, ink and plastic components into a pulp medium. Contact with a deinking chemical causes attraction between the ink components to form larger ink particles. The ink is adsorped onto the plastic components to form ink/plastic clusters which are removed to produce a substantially ink and plastic free pulp medium. Recycled paper products with improved strength comprising paper fibers from pulp medium produced in accordance with the method of the invention are also provided.

11 Claims, 2 Drawing Sheets

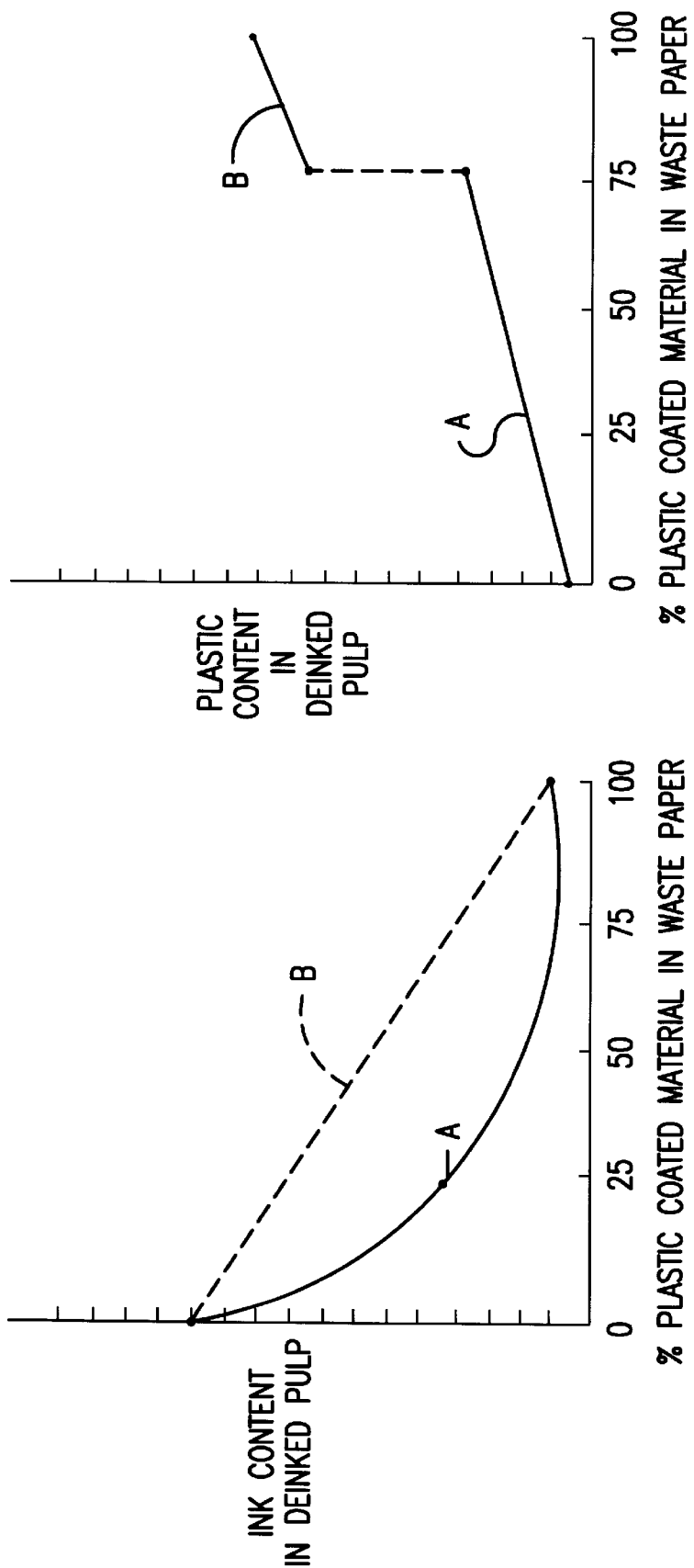

METHOD FOR RECYCLING MIXED WASTEPAPER INCLUDING PLASTIC-CONTAINING PAPER AND INK PRINTED PAPER

FIELD OF INVENTION

This invention generally relates to a method to recycle mixed wastepaper including plastic containing paper and printed paper. More particularly, it concerns a process which deinks mixed wastepaper by agglomeration of ink particles and the formation of ink/plastic clusters which are removed by screening procedures to produce a substantially ink and plastic free pulp medium used to make recycled paper and board products.

BACKGROUND ART

Separately, both printed office wastepaper and plastic coated paperboard have been difficult to deink. Office waste including non-impact (laser and xerox) toners is not easily purified by conventional deinking methods such as washing, flotation and dispersion. Alternatively, agglomeration deinking methods are used but are expensive procedures due to the high chemical cost of the agglomeration chemicals used.

Recovery of paper fiber from milk cartons and other types of liquid packaging or plastic coated or laminated paper or paperboard is hampered by plastic contamination in the recovered pulp. Slotted screens can be used to remove plastic particles but are not entirely effective. The liquid packaging often contains a wet strength additive, which prevents effective repulping, and the resulting flakes of unpulped paperboard tend to seal over and plug the screen plates. Also, liquid packaging tends to contain a significant percentage of long softwood fibers, which also make screening with fine slots more difficult. The thin flexible plastic also tends to plug fine slots, forcing the use of larger slots which compromise the screening efficiency. Therefore, removal of plastic contaminants resulting from laminated plastic or plastic coatings remains a problem.

Conventional recycling processes utilize well characterized and presorted grades of wastepaper. Mixed wastepaper streams are not readily recycled because of their non uniform properties and changing chemical compositions of the constituents.

Separate processes for deinking various types of printed paper and plastic coated paperboard are known in the art. Representative of such processes include: U.S. Pat. No. 1,628,931 to Todd which discloses a process for extracting wax from waste waxed paper by dissolving in a solution of tri-sodium phosphate and soda ash; U.S. Pat. No. 2,776,209 to O'Flynn which discloses a method for deinking and dewaxing wastepaper by repulping in a non-acidic aqueous solution of urea; U.S. Pat. No. 3,933,577 to Penque which discloses a method for recycling municipal solid waste (garbage) by shredding waste material and passing through an air elutriator to separate into a heavy stream containing metals and a light stream containing paper, plastics, etc.; and U.S. Pat. No. 4,332,638 to Mauer which provides a process and apparatus for sorting long and short fibers from a mixture of different types of wastepaper, including plastic coated paper.

The prior art describes separate methods for deinking printed wastepaper and plastic coated paperboard. However, the art has not shown a deinking process for recycling a combined mixture of printed wastepaper and plastic coated paperboard to produce clean pulp. The invention is directed to the provision of such a process in which simultaneous repulping of a mixture of plastic coated and printed paper and contact with a deinking chemical presents a synergy in which separated plastic components attract and effectively adsorb ink agglomerates to form ink/plastic clusters. These clusters are readily removed from the pulp medium to produce a high level of pulp cleanliness for creating recycled paper products. Further advantages of the invention over prior practices include repulping both long fibered paperboard pulp with short fibered office waste paper together which makes the removal steps easier, particularly the screening stages, and prevents the screens from becoming overloaded with plastic and flakes of unpulped paperboard. It further allows the use of fine slotted screens for complete removal of plastic from the pulp.

There is a need in the art for processes which are less complex to produce recycled paper. This invention is directed to the provision of such processes which have wide range applications in creating recycled paper with a high level of cleanliness, and using a low dosage of agglomeration chemical.

Accordingly, it is a broad object of the invention to provide a deinking process for the recycling of plastic coated and printed paper.

Another object of the invention is to provide a low cost deinking process that effectively and efficiently removes ink and plastic particles without using high concentrations of expensive agglomeration chemicals.

A still further object of the invention is to provide a recycled paper product having improved strength and a high level of cleanliness made from recycled plastic containing paper and printed wastepaper.

DISCLOSURE OF INVENTION

In the present invention, these purposes, as well as others which will be apparent, are achieved generally by providing a process for recycling a combined mixture of plastic containing paper and printed paper to produce clean pulp which is free of both ink and plastic contamination.

The process includes repulping the two types of wastepaper together in a repulping vessel, preferably a hydrapulper, to disperse the paper fibers, ink and plastic components into a pulp medium. The pulp medium is contacted with a deinking chemical which causes attraction between the ink components to form larger ink particles. The repulping and contact with the deinking chemical may be simultaneous or in separate steps. Process and reaction conditions are controlled in the repulping vessel so that effective agglomeration of the ink particles is accomplished. Any deinking chemical capable of causing agglomeration of the ink particles can be employed. Concentrations of the deinking chemical, as well as the pH and temperature of the pulp medium are adjusted to yield maximum agglomeration of the ink particles. The separated plastic attracts and effectively scavenges the ink agglomerates in the hydrapulper to form ink/plastic clusters.

In addition, oxidizing agents such as sodium hypochlorite and persulfate compounds can be added to the hydrapulper to assist in breaking down any wet strength additives that may be present in the liquid packaging (plastic containing) wastepaper.

Following repulping, screening and cleaning procedures are used for removal of the ink/plastic clusters and other remaining plastic and ink particles. At least one screen preferably has a slot width in the range of 0.004" to 0.010". In addition, after screening, centrifugal cleaners may be used for further removal of ink and plastic particles. The resulting substantially ink and plastic free pulp medium has a speck removal and brightness level sufficient to produce recycled paper products.

Preferred applications of the method of the invention include use in deinking plastic coated and printed paper to produce high-grade recycled printing and writing paper, or other products such as tissue and towelling, bag grades or board products. Advantageously, the deinking method of the invention provides a process for recycling plastic coated and printed paper that is less complex and expensive than known agglomeration processes.

The method provides efficient removal of ink by agglomeration onto the plastic surface reducing the dosage of agglomeration chemical required. In addition, since the agglomerated ink is attached to plastic it is readily thickened for burning or landfilling in contrast to the ink separated from a flotation deinking system which is difficult to thicken. The method also provides efficient removal of plastic contaminants by using finer slotted screens than can be used on the plastic coated paper when it is processed alone.

Other objects, features and advantages of the present invention will be apparent when the detailed description of the preferred embodiments of the invention are considered in conjunction with the drawings, which should be construed in an illustrative and not limiting sense as follows:

BRIEF DESCRIPTION OF THE DRAWINGS

FIG. 3 is a graphic illustration of the synergistic effect of the formation of ink/plastic clusters on the ink content in deinked pulp; and FIG. 4 is a graphic illustration of the screening efficiency of plastic containing wastepaper.

DETAILED DESCRIPTION OF THE PREFERRED EMBODIMENT

Figure 1:
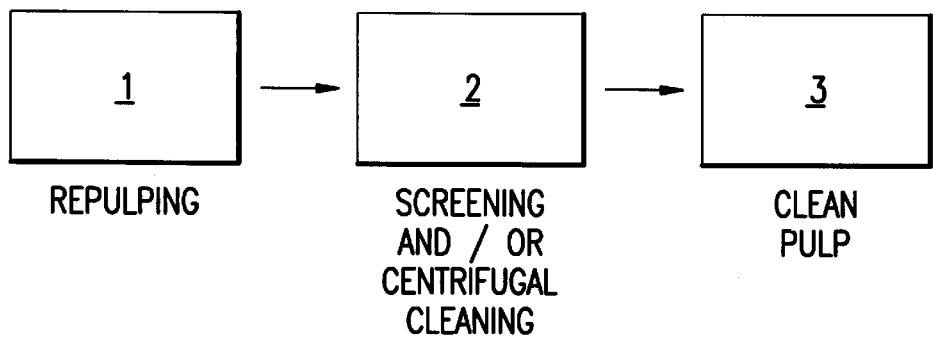
FIG. 1 is a diagrammatic view of the general process steps of the invention for deinking of mixed wastepaper.

With further reference to the drawings, FIG. 1 is a diagrammatic view of the general process steps for the deinking of the mixed wastepaper, including plastic containing and printed paper.

Repulping of the plastic containing and printed paper occurs in a repulping vessel to disperse paper fibers, ink and plastic components into a pulp medium 1. During, or after repulping, the pulp medium is contacted with a deinking chemical. The presence of the deinking chemical causes the ink components to form larger ink particles. The separated plastic component attracts the ink to form ink/plastic clusters. The pulp medium is passed through one or more steps of screening or centrifugal cleaning 2, to remove the ink/plastic clusters and ink and plastic contaminants to produce a substantially ink and plastic free pulp medium 3. The clean pulp medium can then be made into a recycled paper product through conventional papermaking techniques.

The mixed wastepaper is selected from the group consisting of plastic containing paper or paperboard, non-impact or impact printed paper or paperboard, and mixtures thereof. The wastepaper includes both wood containing and wood free grades of paper. Various types of paper or paperboard may be used in this invention including sorted or unsorted computer printout paper, writing paper, fine paper, coated and uncoated magazine paper, newsprint and packaging board. Also, various types of plastic containing paper and paperboard, including gable-top milk and juice cartons, aseptic packaging, polyethylene coated, polyester coated or complex layered coatings or laminations including aluminum foil, or scrap from the manufacturing operations for liquid packaging, may be used in the invention process. This list is merely representative of the different types of plastic coated and printed paper and is not considered to be inclusive of all the possible types of printed paper which may be used in the invention.

The mixed wastepaper can generally comprise up to 75% plastic coated wastepaper, since over 75% typically results in screening problems. FIG. 4, discussed in detail later, illustrates the screening efficiency limits of plastic containing wastepaper. Typically, plastic on the liquid packaging and coated paperboard during its manufacture has been corona treated or flame treated for the adherence of printing ink to the plastic surface. This treatment is believed to increase the adherence of the ink particles to the plastic surface during the process of the invention. The plastic is typically polyethylene or polyethylene terephthalate (PET). Thus, this type of plastic would be expected to attract ink particularly well and act as a substrate for ink agglomeration to form ink/plastic clusters of a size which can then be readily removed from the pulp medium.

The repulping action causes ink particles and plastic components to separate from the wastepaper fibers. The presence of a deinking agent enhances the separation of the ink from the fiber surface and in addition changes the chemistry of the ink particles by causing them to become more hydrophobic. This results in formation of ink agglomerates since the ink particles are more attractive to each other and then in turn are more attractive to the plastic. As stated the ink present on the plastic coated wastepaper typically remains on the plastic during repulping due to the corona or flame treatment during manufacture.

Typically the pH of the aqueous medium during agglomeration is in the range of 8–13. The pH is controlled so that there is a balance between the "dispersion" action of the ink from the fibers and the "agglomeration" action of the separated ink particles. If the pH is too high this balance is disrupted and small ink particles may remain dispersed in the medium as opposed to being attracted to each other to form larger agglomerates. A high pH, i.e. 9–13, is desirable for helping to break down some types of wet strength additives present in liquid packaging. A preferred alkaline pH of 8–12 helps to release ink from the surface of the printed paper without significant "dispersion" thereby helping agglomeration.

Figure 2:
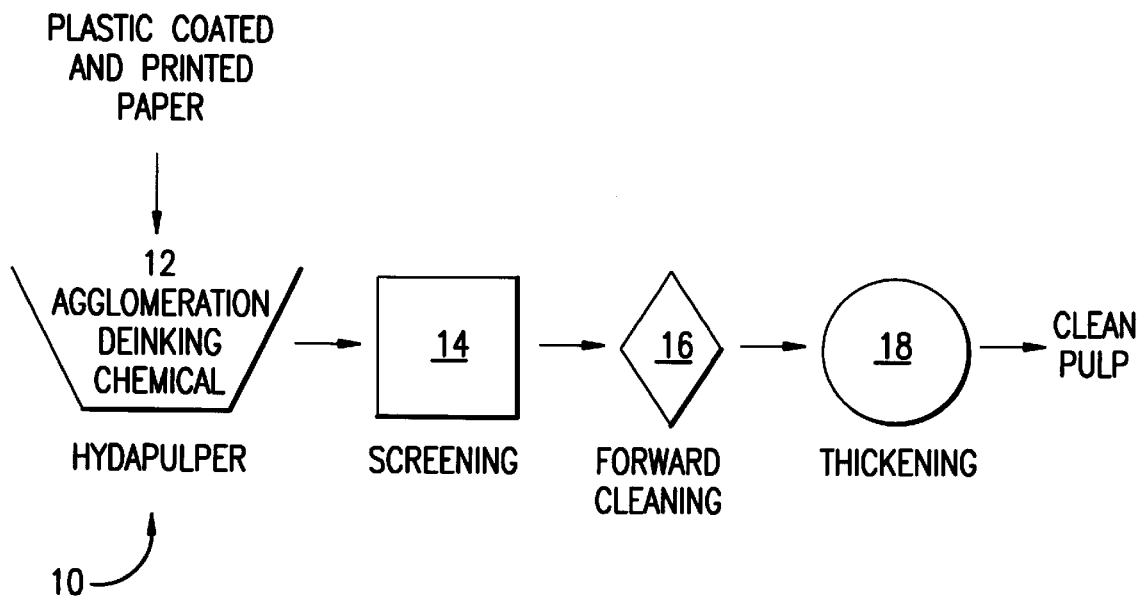
FIG. 2 is a schematic view of the apparatus for recycling mixed wastepaper in accordance with the process of the invention.

FIG. 2 is a schematic view of an apparatus, generally designated 10, for practicing the deinking process of the invention. As shown in FIG. 2, the mixed wastepaper is repulped in an aqueous medium at hydrapulper 12 with an agglomeration deinking chemical to produce a pulp medium including ink and plastic components.

Concentrations of the deinking chemical, as well as the pH and temperature of the pulp medium are adjusted to yield maximum agglomeration of the ink particles. Preferably the repulping is carried out at temperatures in the range of 120° to 200° F. for 15 to 90 minutes. The pulp consistency in the hydrapulper is preferably 7 to 15% at an alkaline pH, preferably in the range of 8 to 13. This is in contrast to repulping only plastic coated paperboard with is optimally repulped at 16 to 20% consistency. These higher consistencies were found to produce excessive breakdown of the ink agglomerates in the repulping vessel which is detrimental to ink removal. Pulp consistency below 7% produces slow repulping of the paper and higher chemical usage.

The repulping is preferably done in an alkali aqueous medium, with sodium hydroxide added to speed the repulping and to aid in the separation of ink particles from the pulp fibers. The addition of organic or mineral solvents are not required for the synergistic effect of the invention process in which the separated plastic components attract and effectively adsorb ink agglomerates to form ink/plastic clusters. However, small quantities of solvents may be added to improve the ink agglomeration action. Use of such solvents in the invention process is generally not desirable because of environmental problems in using such materials.

Ambient temperature is normally preferred in conventional deinking processes when using highly contaminated waste in the hydrapulper since at higher temperatures contaminants, such as stickies, would break down making them difficult to remove. However, in this invention the stickies tend to agglomerate with the ink on the surface of the plastic which protects the stickies from further breakdown.

Conditions during repulping in the hydrapulper are controlled so that the ink agglomerates being formed are not being broken down by the mechanical action of the hydrapulper. The plastic provides a surface similar to the surface of a solid ("heterogeneous") catalyst or "collector" where fine ink particles are attracted to agglomerate with other ink particles. The rate of formation of agglomerates then becomes much greater than the rate of agglomerate breakdown by the attrition in the hydrapulper.

The pulp medium is then typically passed to a detrashing device to remove larger pieces of plastic, wood, metal, paperclips, etc., followed by a liquid cyclone device to remove heavy debris such as staples and glass. Coarse screening is done to remove other smaller contaminants which might plug or damage the slotted screen.

The pulp medium is passed through pressurized fine screens 14, having slots of width between 0.004" to 0.010". Preferably, secondary and tertiary screening stages are often used for both coarse and fine screening to reduce the loss of good fiber from the system.

The slotted screens, remove a large percentage of the stickies from the system, including adhesives from self-stick envelopes and labels. Removal of the stickies is critical during the deinking process. High efficiency stickies removal by the fine screens is achieved in the system by maintaining the screening temperature at 130° F. or less, so that the stickies do not become softened and more deformable for extrusion through the slots into the pulp accepts stream.

The large ink particles are easily separated into the centrifugal cleaner rejects, and are removed from the system for disposal by landfilling or burning or for other uses. High efficiency in the cleaners 16 is required for fine ink removal which is achieved by using a smaller diameter cleaner, or using a higher pressure drop or a lower pulp consistency.

Preferably the deinking chemical is present at a dosage ranging from between 0.1–2.0% by weight calculated on the dry weight of the pulp used. Any deinking chemical capable of causing agglomeration of ink particles can be employed. Many of these agents are surfactants which make the ink hydrophobic and induce a tendency to agglomerate. For example, deinking agents such as Sansink PM-201 available from PPG Industries, Inc., Pittsburg, Pa. and BRD 2311 available from Buckman Laboratories, Memphis, Tenn. are suitable for use in the invention process. Agglomerating agents may also comprise polymeric materials which act as collectors to increase the size of the agglomerates such as the PX-101 by PPG Industries. Any of these agents or other similar commercially available deinking agents may be used in the present invention process. The process of agglomeration of ink particles has also been referred to as "aggregation", "densification", or "dispersion", and these terms are used interchangeably to describe the same process. (See J. K. Borchardt, Proceedings of TAPPI 1993 Pulping Conference, page 839). The agglomeration chemical may be chosen to be suitable for the type of wastepaper being used.

For decreasing lightweight contaminants, including hot melts, stickies, wax, latex, adhesives, styrofoam and lightweight plastics, the deinking process of the invention can include a number of additional steps. The use of reverse cleaners, through-flow cleaners, rotary cleaners or combination cleaners which remove both heavy and light debris can be effective.

Flotation deinking can be used for additional ink removal, but this step should not be necessary. Also, to achieve a brightness increase in the final ink and plastic free pulp medium dissolved air flotation or clarification can be used on the grey water from the final pulp thickener.

In yet another alternative embodiment, additional sets of forward cleaners can be added for further improvement in the cleanliness of the pulp.

In addition, oxidizing agents such as persulfate compounds or sodium hypochlorite can be used for enhancing the breakdown of the wet strength additives present in the paperboard, thus reducing the batch time, bleaching the pulp and controlling odor and microorganisms.

The substantially ink and plastic free pulp medium is made into a paper or paperboard product by conventional papermaking techniques. These recycled paper products have improved strength as compared to recycled paper products produced solely from recycled printed office waste. Office wastepaper contains fillers such as calcium carbonate and has lower strength properties than plastic coated paper or paperboard. The plastic coated paper or board generally has no fillers and has a higher pulp strength due to a higher softwood (long fiber) content and low ash content. Thus a recycled product made from the pulp medium produced in accordance with the invention will have a higher strength and lower ash content than paper made from office waste alone.

Table I below illustrates the higher softwood content and lower ash content of pulp recovered from plastic containing wastepaper, i.e. milk cartons. Samples #1 to 4 represent commercially available deinked pulps produced from office waste and other grades of wastepaper, not including any plastic containing wastepaper. The ash content was measured after combustion in a muffle furnace at 500° C.

TABLE I

|  | MILK CARTON PULP | SAMPLE #1 | SAMPLE #2 | SAMPLE #3 | SAMPLE #4 |
|---|---|---|---|---|---|
| FIBER ANALYSIS |  |  |  |  |  |
| % SOFTWOOD | 79 | 35 | 26 | 28 | 27 |
| % HARDWOOD | 21 | 59 | 71 | 70 | 66 |
| % GROUNDWOOD | 0 | 6 | 3 | 2 | 7 |
| ASH CONTENT | 0.3 | 3.1 | 3.5 | 3.6 | 1.8 |

The following examples illustrate advantages of the process for deinking mixed wastepaper over known practices.

Example I is a control in which only printed wastepaper was repulped with a deinking chemical. In Example II, the same reaction conditions as Example I were used except that plastic containing paperboard was included in the repulsing vessel in addition to the printed wastepaper and deinking chemical.

These examples are merely representative and are not inclusive of all the possible embodiments of the invention.

EXAMPLE I

Three hundred pounds (300 lb) of white office wastepaper, containing approximately equal amounts of impact and non-impact printed paper, was repulped for 60 minutes in a 5' diameter hydrapulper equipped with a turbine type rotor at 11% pulp consistency, 160° F. and a pH of 10. A dosage of 0.8% agglomeration deinking chemical which is a mixture of alcohols and nonionic surfactants was used, calculated on oven dry waste paper. The pulp was then extracted through 3/8" holes in the bedplate of the pulper and screened using a pressure screen equipped with 0.050" holes. The screen did not remove a substantial amount of the agglomerated ink and the screened pulp had a TAPPI speck count of 1899 ppm (TAPPI Method T-213).

The average size of the ink agglomerates in the feed to the pressure screen was 0.3 sq.mm and very few of these particles were large enough to be removed by the pressure screen.

EXAMPLE II

The conditions in Example I were repeated using a 2:1 ratio of office waste to post-consumer milk cartons. The plastic coating separated from the milk cartons, and the agglomerated ink was adsorped onto the plastic to form ink/plastic clusters. A majority of the ink/plastic clusters were large enough to be removed by the pressurized screen. The smallest of the ink/plastic clusters in the feed to the screen was about 1.5 sq.mm in size but most were much larger and were of irregular shape. The majority of the ink was then removed with the plastic in the screening stage using a screen having 0.050" perforations and the dirt count on the screened pulp was reduced to 611 ppm.

With reference to FIG. 3, wastepaper containing 100% plastic coated paper produces a pulp with a low speck count, because of its low initial ink content. Office wastepaper has an extremely high ink content and therefore makes dirty deinked pulp. In combining the wastepaper streams the synergistic effect lowers the speck content of the office wastepaper to that closer to the plastic coated paper. In FIG. 3 line A illustrates the synergistic effect which results from the formation of the ink/plastic clusters and line B is a theoretical line which would occur if no ink/plastic clusters were formed.

Deinked office wastepaper has a very low plastic content due to very fine slotted screens which are used. Wastepaper containing 75–100% plastic containing material cannot be screened with very fine slots because of plugging problems caused by the plastic, by the longer softwood fibers and by unpulped flakes of fiber. In FIG. 4 a graphic illustration shows that along line A high efficiency screens with very fine slots are effective for plastic removal. Along line B this efficiency diminishes because less efficient screens with lower plastic removal must be used.

Unexpectedly, the present invention process provides a method for recycling a combined mixture of plastic containing and printed paper to produce clean pulp which is free of both ink and plastic contamination. As illustrated in the examples the different properties and compositions of the different wastepaper streams provide formation of ink/plastic clusters which are easily removed by further processing through slotted screens and centrifugal cleaners to produce a substantially ink and plastic free pulp medium. This recycled pulp has speck removal and brightness levels sufficient to produce high-grade recycled paper through conventional papermaking processes.

The simplicity of the equipment used and the high amount of ink and plastic removal without dependence on a particular deinking chemical formulation make the deinking process of the invention advantageous over prior art practice.

Advantageously, the method of this invention for deinking printed paper is less complex than conventional deinking processes involving washing and flotation procedures. Further advantage of the process of the invention is in the utilization of low quality and low cost wastepaper, i.e. office waste and milk cartons that are polyethylene coated, which is difficult to recycle.

It will be recognized by those skilled in the art that the invention has wide application in recycling a variety of plastic coated and printed paper to produce a high quality pulp.

Numerous modifications are possible in light of the above disclosure such as application of alternative agglomeration deinking chemicals chosen according to the wastepaper treated. In addition, alternative process parameters may be employed in the invention, which include using the deinking agent with no pH adjustment to the wastepaper; using the deinking agent in an alkali pH range; or using the deinking agent in the presence of other chemicals suitably employed in a deinking and/or papermaking process such as oxidizing agents, bleaching agents, defoamers, sizing agents, brighteners, and water quality processing agents among others.

Therefore, although the invention has been described with reference to certain preferred embodiments, it will be appreciated that other composite structures and processes for their fabrication may be devised, which are nevertheless within the scope and spirit of the invention as defined in the claims appended hereto.

We claim:

1. A method to recycle mixed wastepaper, including plastic containing paper and ink printed paper, comprising:

repulping the mixed wastepaper in a repulping vessel to disperse paper fibers, ink and plastic components into a pulp medium; said mixed wastepaper comprising up to 75% plastic containing paper, such that the ratio of printed paper to plastic containing paper in said mixed wastepaper is in the range of 3:1 to 1:3;

wherein said repulping is in an alkali aqueous medium having a pH in the range of 8–13 at a temperature in the range of 120° to 200° F.;

contacting said pulp medium with a deinking chemical, wherein the presence of said deinking chemical causes attraction between the ink components to form larger ink particles and further causes said ink particles to be more attractive to said plastic components;

adsorbing said ink particles onto said plastic components to form ink/plastic clusters; and removing said ink/plastic clusters from said pulp medium to produce a substantially ink and plastic free pulp medium.

2. The method as defined in claim 1, wherein said repulping and said contact with said deinking chemical is done simultaneously in a repulping vessel.

3. The method as defined in claim 1, wherein the mixed wastepaper is selected from the group consisting of plastic coated or laminated paper or paperboard, non-impact or impact printed paper or paperboard, and mixtures thereof.

4. The method as defined in claim 1, wherein said repulping is carried out for a time between 15 to 90 minutes.

5. The method as defined in claim 1, wherein said repulping is at consistencies in the range of 7–15%.

6. The method as defined in claim 1, wherein said deinking chemical is present at a dosage ranging from between 0.1–2.0% by weight, calculated on the dry weight of the pulp used.

7. The method as defined in claim 1, comprising removing said ink/plastic clusters from said pulp medium by screening procedures.

8. The method as defined in claim 7, wherein at least one screening stage uses a slotted screen having a slot width in the range of 0.004" to 0.010".

9. The method as defined in claim 1, comprising removing said ink/plastic clusters from said pulp medium by screening procedures followed by centrifugal cleaning procedures to remove remaining ink and plastic components from said pulp medium.

10. The method as defined in claim 1, wherein the repulping is done in the presence of oxidizing agents.

11. The method as defined in claim 10, wherein said oxidizing agents are persulfate compounds or sodium hypochlorite.

* * * * *

UNITED STATES PATENT AND TRADEMARK OFFICE
CERTIFICATE OF CORRECTION

PATENT NO. : 5,865,947
DATED : February 2, 1999
INVENTOR(S) : Larry D. Markham and Narendra R. Srivatsa It is certified that error appears in the above-identified patent and that said Letters Patent is hereby corrected as shown below:

At column 4, line 64, delete "with" and insert --which--.

At column 7, line 4, delete "repulsing" and insert --repulping--.

Signed and Sealed this

Twelfth Day of October, 1999

*Attest:*

Q. TODD DICKINSON

*Attesting Officer*    Acting Commissioner of Patents and Trademarks